United States Patent [19]

Muhr et al.

[11] 4,267,758
[45] May 19, 1981

[54] ACTUATOR MOUNT FOR POWER SHEAR OR PUNCH

[75] Inventors: Richard Muhr, Attendorn; Werner Schröder, Finnentrop, both of Fed. Rep. of Germany

[73] Assignee: Muhr und Bender, Attendorn, Fed. Rep. of Germany

[21] Appl. No.: 72,627

[22] Filed: Sep. 5, 1979

[30] Foreign Application Priority Data

Sep. 6, 1978 [DE] Fed. Rep. of Germany ....... 2838733

[51] Int. Cl.³ .............................................. B23D 15/14
[52] U.S. Cl. ...................................... 83/571; 83/639; 83/698
[58] Field of Search .................. 83/639, 698, 571, 563, 83/580; 29/568; 72/446, 453.01; 100/224, 229

[56] References Cited

U.S. PATENT DOCUMENTS

| | | | |
|---|---|---|---|
| 2,552,958 | 5/1951 | Graham et al. | 83/639 X |
| 3,255,655 | 6/1966 | Stockard, Jr. | 83/639 X |
| 3,559,522 | 2/1971 | Valente | 83/571 |
| 3,593,610 | 7/1971 | Valente | 83/580 |
| 3,628,231 | 12/1971 | Pancook | 83/563 X |
| 3,704,644 | 12/1972 | Cloup | 83/639 |
| 4,067,252 | 1/1978 | Peddinghaus et al. | 83/639 X |

Primary Examiner—Frank T. Yost
Attorney, Agent, or Firm—Karl F. Ross

[57] ABSTRACT

A metalworking machine such as a punch or shear has a pair of substantially parallel and spaced-apart frame plates which are mounted fixedly relative to each other and which flank a vertically displaceable work slide formed at its upper edge with a T-shaped notch. A hydraulic ram is fixed to the plates and has a flat T-shaped piston rod receivable in the T-shaped notch of the slide for force transmission between the piston and the slide. The piston and slide can be separated from each other by relative lateral displacement perpendicular to the plane of the slide.

6 Claims, 3 Drawing Figures

ACTUATOR MOUNT FOR POWER SHEAR OR PUNCH

FIELD OF THE INVENTION

The present invention relates to a metal working machine such as a power shear or punch. More particulary this invention concerns such a machine having a slide-type tool.

BACKGROUND OF THE INVENTION

A power shear is described in our jointly filed and copending application Ser. No. 072,628 wherein a tool-carrying slide is displaceable in a slide direction between a pair of fixed parallel plates. Normally such a slide is displaced relative to the two plates flanking it by a hydraulic ram having a cylinder resting on the two fixed plates, and having a piston displaceable in the slide direction and connected via a piston rod to an edge of the slide. The ram is normally double-acting so that it can move the slide forwardly and backwardly in the slide direction.

Normally such a machine, which can be used for shearing, punching coping, and carrying out similar metalworking operations on flat plate stock or profile stock of many different types, has its piston rod bolted via a flange arrangement to the edge of the slide. Thus, in the event that one wants to change the slide or the ram that serves as actuator, one must undertake the laborious disassembly of the connection between the piston rod and the slide. Since, however, this connection must be capable of transmitting considerable forces in both directions, it is hitherto been considered impossible to design it for easy disassembly.

OBJECTS OF THE INVENTION

It is an object of the instant invention to provide an improved metalworking machine of the shear or punch type.

Another object is to provide such a machine wherein the slide and its actuator can be relatively easily disconnected from each other, but wherein the connection between them is nonetheless capable of transmitting considerable force in the plane of displacement of the slide.

SUMMARY OF THE INVENTION

These objects are attained according to the instant invention by forming the slide at its edge turned toward the ram constituting its actuator with a throughgoing cutout that opens at both faces and at the edge and has a pair of cutout faces directed oppositely toward each other in the direction of displacement of the slide. The piston rod of the hydraulic ram acting as the actuator for this metalworking machine has an end engaged in the cutout and having in turn a pair of piston faces directed oppositely away from each other in the slide direction and respectively engageable with the cutout faces. The piston face directed forwardly in the slide direction bears on forward displacement of the piston rod in the direction of the cutout face facing backwardly in the slide direction, and vice versa. Thus extremely good force transmission in the direction of displacement of the slide is created between the slide and the piston rod. Nonetheless it is possible to separate these two elements merely by displacing the one relative to the other in a direction perpendicular to the plane including the slide direction. In fact no complex bolting or other interfitting is necessary, so that the structure constituting this connection is extremely simple while still being at least as effective as the prior-art connections.

It is possible in accordance with this invention, if one choses to use a piston rod of larger diameter than the spacing between the two plates guiding the slide, to cut away these two plates at their upper edges to accommodate such a piston rod. According to another feature of this invention, however, a flat plate-shaped piston rod is employed which has a width measured parallel to the plates between which it fits which is equal to the diameter of the piston and having a thickness measured perpendicular to these plates which is slightly less than the spacing between them. Such a piston rod can, therefore, be extremely rigid while easily fitting between the two plates and connecting solidly with the tool-carrying slide which is also displaceable between the two plates.

With this last-described system it is advantageous if at least one of the plates is formed with a laterally opening cutout with which the piston rod is alignable when fully retracted. Thus when fully retracted it is possible to disconnect the entire hydraulic ram and withdraw it in a direction perpendicular to the two plates from the assembly, simultaneously disconnecting the piston rod from the work slide. Normally only one of the plates should have such a cutout, so that accidental twisting of the piston rod and jamming at the upper edges of the plates is impossible.

In accordance with another feature of this invention both the end of the piston rod and the throughgoing cutout or notch in the workslide are T-shaped. In this manner a relatively large surface area is available for force transmission axially of the ram between the piston rod and the slide.

SPECIFIC DESCRIPTION

Figure 1:
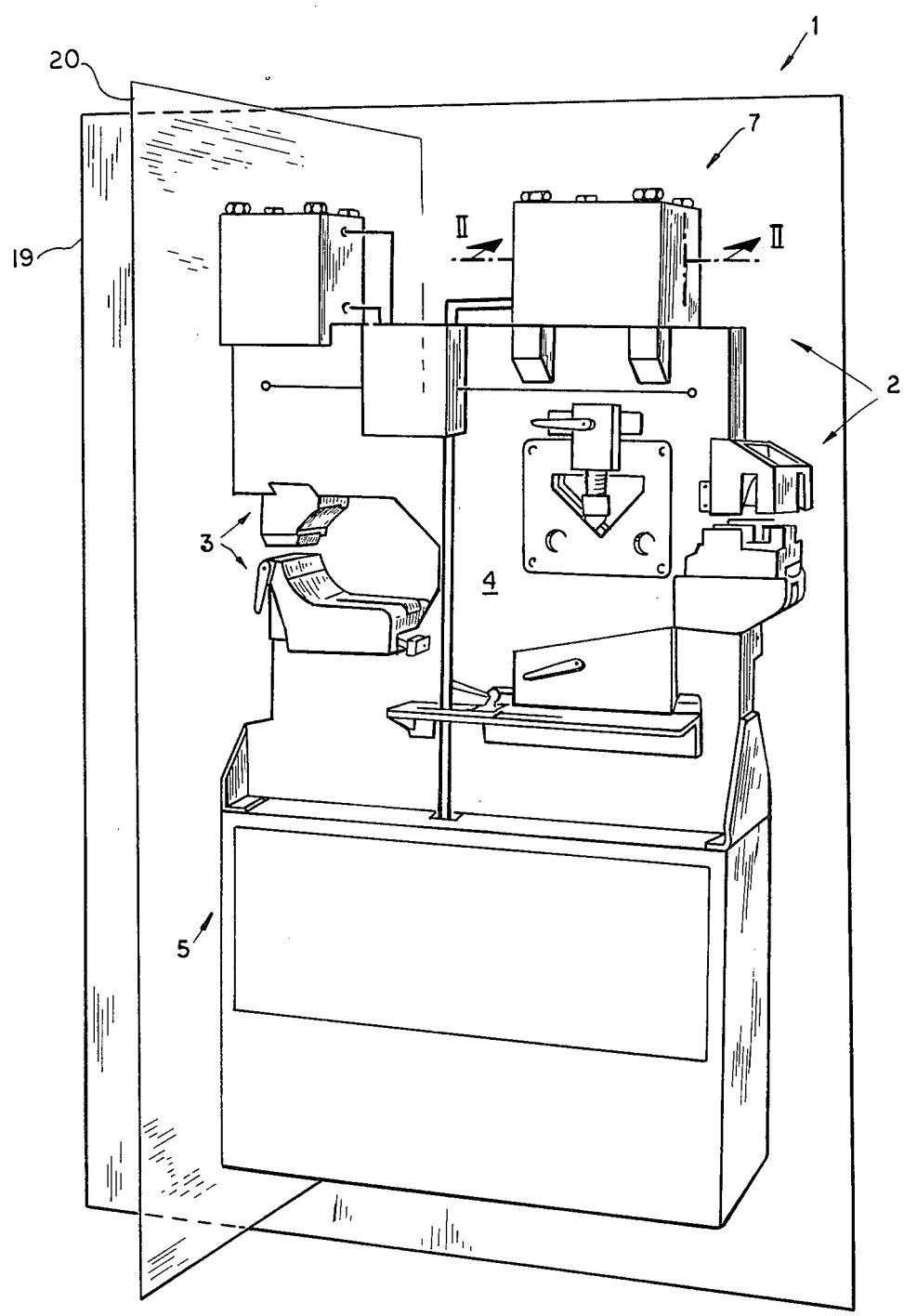
FIG. 1 is a perspective view of the machine according to this invention.

A metalworking machine 1 according to the instant invention has a shear 2 and a punch 3. The machine 1 has a frame 5 formed basically by two parallel and vertical frame plates 4 flanking a minor machine plane 19 and spaced apart by a gap 17 bisected by the plane 19. The shear 2 and punch 3 each have a work slide 6 vertically displaced by a hydraulic actuator 7.

Figure 2:
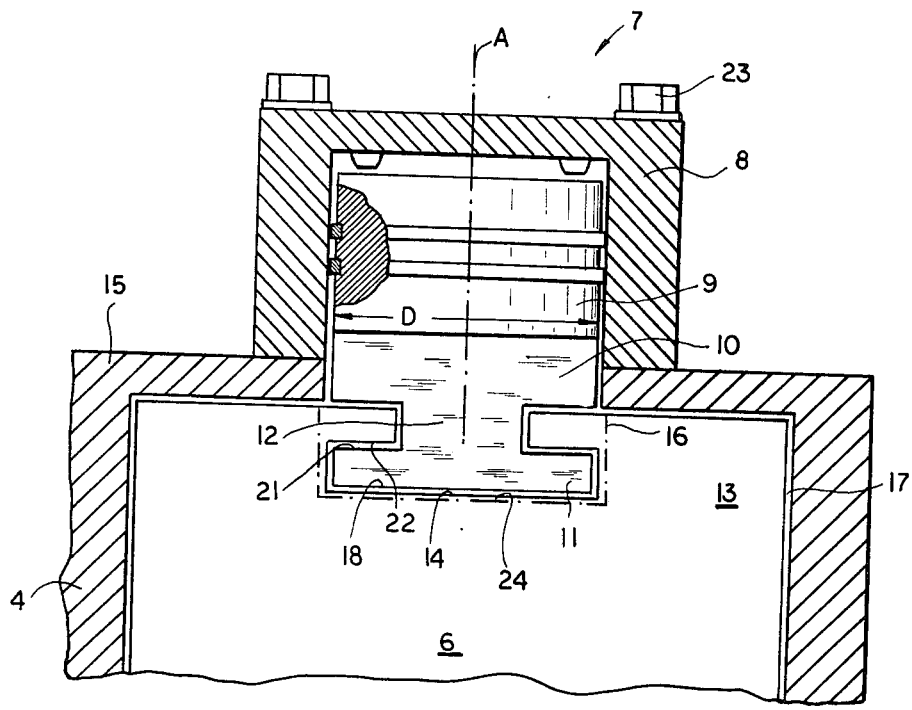
FIG. 2 is a vertical section taken along the plane indicated at II—II in FIG. 1.

FIG. 2 shows the mechanism for the shear 2. The actuator 7 is secured by bolts 23 to the top of the machine and has a cylinder 8 housing a piston 9 reciprocal along a vertical axis A lying in the plane 19. The piston 9 is cylindrical and has a diameter D which is many times greater than the width of the gap 17 between the plates 4 measured in a direction perpendicular to the plane of the view of FIG. 2. This piston 9 has a flat piston rod of a width equal to the diameter D and of a thickness equal to slightly less than the width of the gap 17.

In order to connect the piston rod 10 to the slide 6 the upper end 13 of the slide 6 is formed with a T-shaped cutout 14, and the piston rod 10 is formed with a T-shaped head 11 having a reduced-width neck 12. Thus when the piston 9 moves downwardly along axis A it will bear via an end face 18 of the head 11 on a surface 24 of the T-shaped cutout 14. When moved axially backwardly in the opposite direction the upper surfaces 21 of the head 11 will bear on surfaces 22 of the upper end 13 of the slide 6 for force transmission between the two parts.

In order to allow the actuator 7 to be easily removed from the machine 1 one of the plates 4 is formed at its upper end 15 with a rectangular cutout indicated in dot-dash lines at 16 in FIG. 2. In the fully retracted or uppermost position of the piston 9 the head 11 lies wholly in horizontal registration with this cutout 16 so that the arrangement can be laterally withdrawn.

Figure 3:
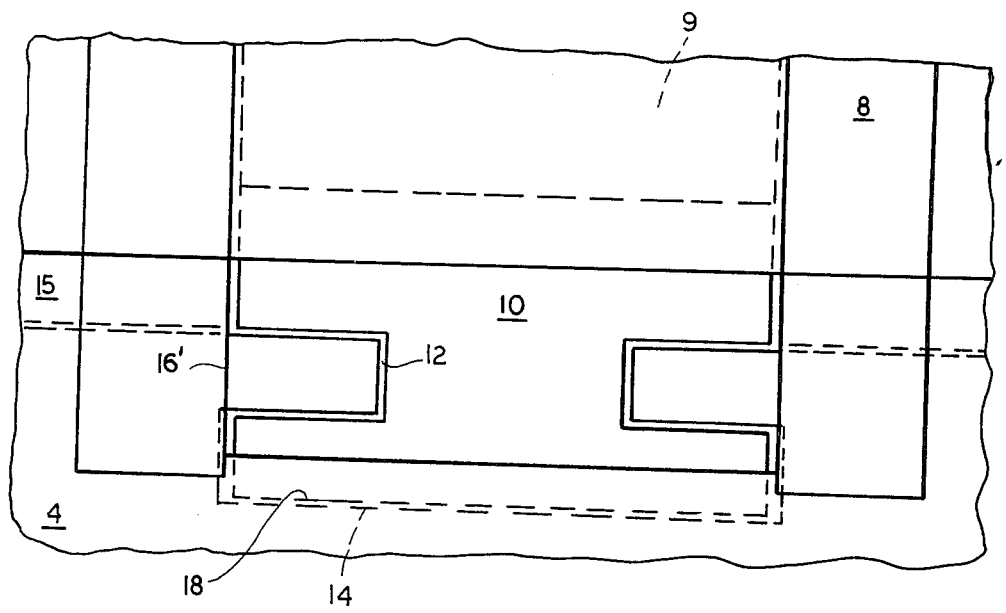
FIG. 3 is a large-scale side view of a detail of the machine according to this invention.

In order to prevent canting of the piston rod 10 the other plate 4 is formd as shown in FIG. 3 with a rectangular cutout 16' whose lower edge is somewhat higher than the lower edge 18 of the piston rod 10 in the uppermost position of the piston 9. Thus this cutout 16', while leaving the various engagement surfaces well exposed for inspection and the like, does not allow the piston rod 10 to turn and become wedged in the machine.

FIG. 1 also indicates how the plane 19 defined by the two plates 4 is perpendicular to the upright main frame plane 20 of the machine.

It is within the scope of this invention to provide the above-described machine with a work holdown of the type described in our above-cited copending application.

We claim:

1. A metalworking machine comprising:
a pair of substantially parallel and spaced-apart frame plates mounted fixedly relative to each other;
a slide displaceable in a slide direction parallel to said plates between said plates and having an edge formed with a cutout opening at said edge throughgoing perpendicular to the plane of said plates, and having a pair of substantially parallel cutout faces directed oppositely toward each other in said direction; and
a hydraulic ram having a cylinder fixed but releasably mounted on said plates, a piston displaceable in said cylinder in said direction, and a piston rod fixed to said piston and having an end engaged in said cutout and having a pair of piston faces directed oppositely away from each other in said direction and respectively engageable with said cutout faces, the piston faces directed forwardly in said direction bearing on forward displacement in said direction on the cutout face facing backwardly in said direction and vice versa.

2. The machine defined in claim 1 wherein said cutout is T-shaped.

3. The machine defined in claim 1 wherein said piston has a piston diameter and said plates are spaced apart by a predetermined distance, said rod having a width substantially equal to said piston diameter and a thickness measured perpendicular to said width equal to slightly less than said distance.

4. The machine defined in claim 1 wherein said machine extends along a main plane substantially perpendicular to the planes of said plates.

5. A metalworking machine comprising:
a pair of substantially parallel and spaced-apart frame plates mounted fixedly relative to each other;
a slide displaceable in a slide direction parallel to said plates between said plates and having an edge formed with a throughgoing cutout opening at said edge and having a pair of cutout faces directed oppositely toward each other in said direction; and
a hydraulic ram having a cylinder fixed but releasably mounted on said plates, a piston displaceable in said cylinder is said direction, and a piston rod fixed to said piston and having an end engaged in said cutout and having a pair of piston faces directed oppositely away from each other in said direction and respectively engageable with said cutout faces, the piston face directed forwardly in said direction bearing on forward displacement in said direction on the cutout face facing backwardly and vice versa, said plates having plate edges adjacent said cylinder, said piston rod being displaceable between an extended end position extending relatively far into and between said plates and a fully retracted end position extending substantially less far into and between said plates, one of said plate edges being formed with a notch aligned in a direction transverse to said plates in said fully retracted position of said piston rod, whereby said piston rod can be transversely disengaged from said slide through said notch when in said fully retracted position.

6. A metalworking machine comprising:
a pair of substantially parallel and spaced-apart frame plates mounted fixedly relative to each other;
a slide displaceable in a slide direction parallel to said plates between said plates and having an edge formed with a throughgoing cutout opening at said edge and having a pair of cutout faces directed oppositely toward each other in said direction; and
a hydraulic ram having a cylinder fixed but releasably mounted on said plates, a piston displaceable in said cylinder in said direction, and a piston rod fixed to said piston and having an end engaged in said cutout and having a pair of piston faces directed oppositely away from each other in said direction and respectively engageable with said cutout faces, the piston faces directed forwardly in said direction bearing on forward displacement in said direction on the cutout face facing backwardly in said direction and vice versa, said plates having upper plate edges adjacent said cylinder, said piston rod having a lower end edge, said piston rod being displaceable only between a pair of vertically offset end positions in and between both of which its said lower end edge lies below said upper edge, whereby said lower end edge of said piston rod lies between said plates at all times so that it cannot cant therebetween.

* * * * *